March 30, 1965   G. A. SCOTT   3,176,118
TEMPERATURE CONTROL MEANS FOR CONVERTIBLE DRAWER OVEN
Filed Sept. 27, 1962                       4 Sheets-Sheet 1

INVENTORS
GEORGE A. SCOTT
BY
*Richard L. Caskin*
HIS ATTORNEY

INVENTORS
GEORGE A. SCOTT
BY
HIS ATTORNEY

March 30, 1965  G. A. SCOTT  3,176,118
TEMPERATURE CONTROL MEANS FOR CONVERTIBLE DRAWER OVEN
Filed Sept. 27, 1962  4 Sheets-Sheet 3

INVENTORS
GEORGE A. SCOTT
BY *Richard L. Caslin*
HIS ATTORNEY

March 30, 1965          G. A. SCOTT          3,176,118

TEMPERATURE CONTROL MEANS FOR CONVERTIBLE DRAWER OVEN

Filed Sept. 27, 1962          4 Sheets-Sheet 4

FIG. 7

INVENTORS
GEORGE A. SCOTT
BY *Richard L. Caslin*

HIS ATTORNEY

United States Patent Office 3,176,118
Patented Mar. 30, 1965

3,176,118
TEMPERATURE CONTROL MEANS FOR
CONVERTIBLE DRAWER OVEN
George A. Scott, Jeffersontown, Ky., assignor to General
Electric Company, a corporation of New York
Filed Sept. 27, 1962, Ser. No. 226,596
9 Claims. (Cl. 219—394)

The present invention relates to a means and manner for controlling the temperature within domestic ovens and particularly convertible drawer ovens which provide the maximum utilization of the equipment in the minimum amount of space.

Extensive consumer surveys of the use of an oven by the average housewife have indicated that an oven is rarely used to capacity. By this is meant that the oven sizes are usually much larger than are necessary for the average sizes of food that are cooked in the oven. However, there are many cooking operations which require more than one oven for maximum flexibility of meal planning. Typical examples of use where more than one oven is needed are the following: simultaneously baking and broiling, warming and baking, or baking two items that require different oven temperatures.

The principal object of the present invention is to provide a domestic oven with a temperature control means having multiple external temperature sensors for accurately detecting the wall temperatures of the oven liner.

A further object of the present invention is to provide a convertible drawer oven which may be arranged into either two small ovens or a single large oven, there being temperature control means for separately controlling the temperatures within the two small ovens and a single combined temperature control means for governing the temperature within the large oven.

A further object of the present invention is to provide a convertible drawer oven of the class described with heating means for each drawer and safety interlock means to de-energize the oven whenever either drawer is even slightly displaced from the supporting cabinet.

A still further object of the present invention is to provide a convertible drawer oven of the class described with heating means within each drawer and quick make and break contacts for the heating means which are operated automatically by the position of the drawers.

The present invention, in accordance with one form thereof, relates to a temperature control means for a convertible oven having either two small ovens or a single large oven. The control means is capable of controlling each small oven independently, or by combining the control means into a single system for controlling the temperature within the single large oven. In its broadest sense, the said control means could be used for a single large oven of a standard range. Instead of detecting the oven air temperatures, this temperature control means utilizes multiple external temperature sensors that are in heat transfer relation with the outer surface of the oven liner walls so as to sense the temperature of the oven walls. In the preferred embodiment there are a pair of external temperature sensors that are vertically spaced from each other within the oven cabinet for cooperation with each small oven compartment. These sensors are combined in a single electrical circuit when they are used in the single large oven so as to average out the difference in temperature between the top and bottom of the oven. As an alternative control means for a single large oven, the sensors could be hydraulic thermostatic bulbs which are joined together and are combined with a single hydraulic thermostat.

This invention is related to a co-pending application entitled "Convertible Drawer Oven" of the present applicant, Serial No. 226,595, now Patent No. 3,143,638, which was filed concurrently herewith, and is likewise assigned to the General Electric Company, assignee of the present invention.

My invention will be better understood from the following description taken in conjunction with the accompanying drawings and its scope will be pointed out in the appended claims.

Figure 1:
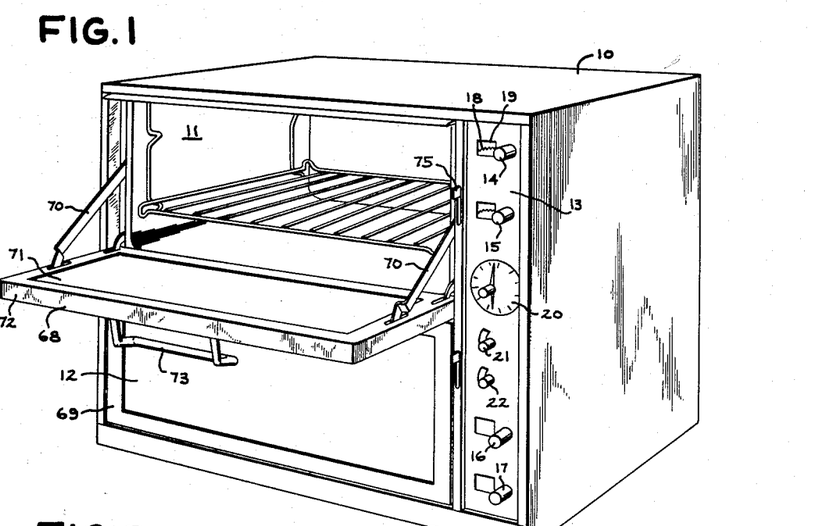
FIGURE 1 is a perspective view of a convertible drawer oven embodying the temperature control means of the present invention.

Turning now to a consideration of the drawings and in particular to FIGURE 1, there is shown a convertible oven comprising a cabinet structure 10 and a pair of pull-out drawer ovens 11 and 12 that are stacked one above the other within the cabinet to form two small oven compartments. A control panel 13 is located down along the right side of the cabinet between two closely spaced vertical cabinet walls, and it includes a temperature control means for each drawer as well as a timer for timing the heating operation of the lower drawer. For example, there is a selector switch 14 and a thermostat 15 for the upper drawer and a selector switch 16 and thermostat 17 for the lower drawer. Each switch and thermostat includes an inner dial 18 located behind the control panel 13 and cooperating with an indicator window 19 in the panel for obtaining the proper setting of the device. The controls 16 and 17 for the lower drawer 12 are also the ones that are used for controlling the single large oven once the upper drawer 11 is inverted to form with the lower drawer 12 a single large oven as mentioned heretofore. Moreover there is a clock timer 20 for cooperation with the selector switch 16 of the lower drawer, and this timer is furnished with a pair of adjusting knobs 21 and 22 for controlling the oven starting time and oven stopping time as will be well understood by those skilled in this art.

Figures 3, 4:
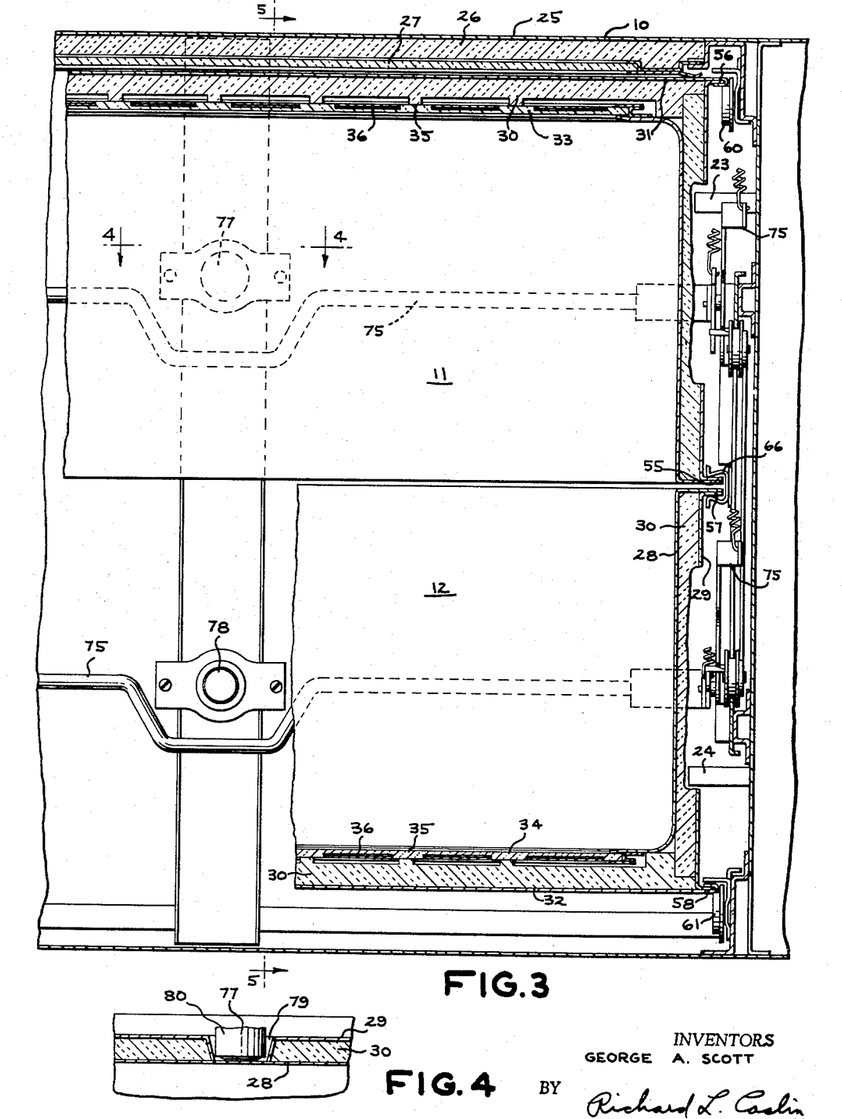
FIGURE 3 is a transverse cross-sectional elevational view of the oven of FIGURE 2 looking toward the back wall of the oven and showing the top drawer in an inverted position to form a single large oven.
FIGURE 4 is a fragmentary cross-sectional plan view of an external temperature sensor that is shown bearing against the oven liner wall of the upper drawer where the view is taken on the line 4—4 of FIGURE 3.
Figure 5:
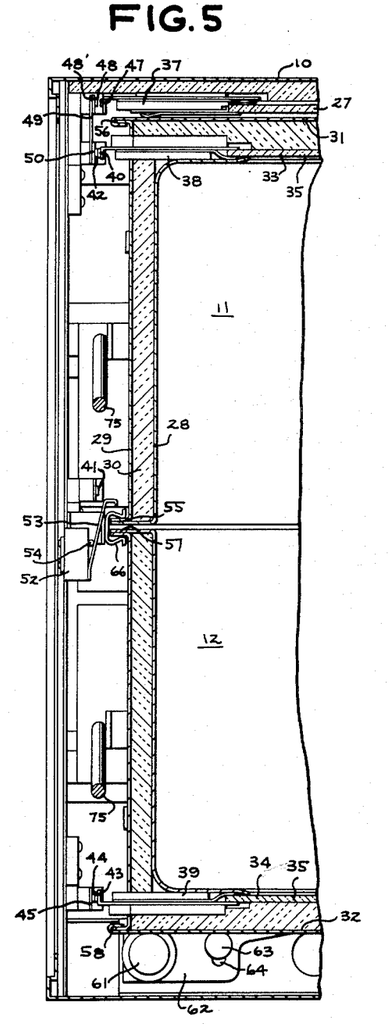
FIGURE 5 is a fragmentary cross-sectional elevational view through the back wall of the oven and taken on the line 5—5 of FIGURE 3 of a single large oven as in the assembly view of FIGURE 2.
Figure 6:
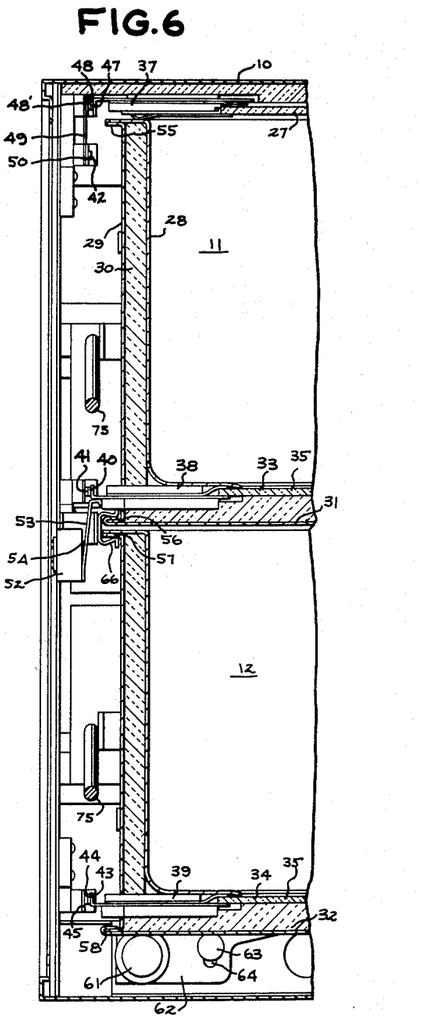
FIGURE 6 is a cross-sectional elevational view taken on the same line as FIGURE 5 but showing the oven drawers arranged as two separate oven compartments as in the assembly view of FIGURE 1.

As can be seen in the cross-sectional views of FIGURES 3, 5 and 6, the cabinet structure 10 is of thin walled sheet metal construction that is substantially uninsulated except for the top wall 25 of the cabinet which has an insulating panel 26 for isolating the top wall 25 from an underlying plate heater 27. This heater 27 forms a broiler unit for the upper drawer 11 when the upper drawer is supported in the cabinet in its upright small oven position of FIGURES 1 and 6. Some means must be provided for retaining the heat in each drawer since very little heat retention is provided by the uninsulated cabinet 10, as explained above. Looking at FIGURE 6, each drawer 11 and 12 is of double sheet metal construction having an inner oven liner wall 28 and an outer wall 29 spaced therefrom with a semi-rigid block of insulation 30 sandwiched therebetween.

The standard type of heat insulating material used in present day ovens is fiberglass that is furnished in blanket or batt form, but it must be supported by some external means, therefore, it contributes nothing to the structural strength of the oven. Since it is the avowed purpose of the present convertible oven to be able to remove the upper drawer 11 and install it back in the cabinet in an inverted position, the weight of the drawer is a critical limiting factor because it is felt that its weight should not exceed fifteen pounds. This amount of weight, fifteen pounds, is believed to be about the maximum weight that the average housewife could be expected to handle for this size drawer. Moreover, a light weight drawer would encourage the cleaning of the oven at the kitchen sink where water may be obtained for washing and rinsing the oven liner walls 28. Accordingly, in order to restrict the amount of weight of the drawer it was deemed expedient to substitute semi-rigid blocks of insulating material 30 so as to utilize the structural strength of the insulation and make it possible to use thinner gauge metal sheets 28 and 29 in the drawer construction. Moreover, by using thin metal sheets the heat lost by conduction through the metal is further reduced. One type of satisfactory insulation is sold under the trade name "Thermobestos" board by the Johns-Manville Company. Another material would be potassium titanate sold by the Du Pont Company or calcium silicate that is available from many sources.

Each drawer 11 and 12 has an insulated bottom wall 31 and 32 respectively that is supplied with a plate-type film heater 33 and 34 respectively. Such film heaters are of the general type that is disclosed and claimed in the copending application of Bohdan Hurko using multiple layers of platinum and gold now Patent No. 3,067,315 which was filed on February 8, 1960, and is assigned to the General Electric Company, assignee of the present invention. It will be recognized by those skilled in this art however that there are other types of film heaters such as tin oxide heaters which might also be substituted in this type of application. The film heater illustrated in FIGURE 3 comprises a dielectric base plate 35 of nearly pure silicon oxide that is sold by the Corning Glass Company under the trade name of "Vycor." To the underside of this base plate is fused a multi-layer metallic film 36 of noble metals such as platinum and gold in a particular relationship so as to prevent the crystallization of the conductive layers at high temperatures. Preferably, this multi-layer film is applied as a narrow strip in a suitable serpentine pattern so as to give nearly uniform temperature gradients over the expanse of the plate. The broiler unit 27 mentioned previously as being positioned beneath the top wall 25 of the cabinet 10 is also a plate-type heater having multi-layers of film of noble metals.

One of the important advantages of using film heaters on a base plate as the heating means is that the plate is essentially self-cleaning in that the high-operating temperatures serve to burn off any food soil or grease spatter that might be deposited on the plate during the normal cooking operations. Another real advantage of film heaters over metal sheathed heating units of the type used today in standard ovens is that no extra space is required for the units for they are built into the bottom wall of the drawer. The presence of the film heater does cut down on the amount of insulation within the bottom walls 31 and 32 of the drawers, but this may be compensated for by providing a sheet of reflective material such as aluminum foil between the film heater and the insulation 30 so as to reflect the heat energy away from the insulation and back into the oven compartment. This space saving feature of the film heaters was the primary reason for choosing them in place of the conventional metal sheathed type heaters. However, it is appreciated that metal sheath units could be substituted in a position adjacent the bottom of each drawer, but each drawer height would have to be increased approximately one inch. Moreover, an additional inch would be required for the broiler unit 27 so that the substitution of metal sheathed heating units would increase the overall height of the oven cabinet by about three inches.

Before leaving the subject of film heaters, attention is directed to both FIGURES 5 and 6 which show a cross-sectional view through the back of the oven cabinet 10, with the upper drawer 11 in its inverted position in FIGURE 5 and in its upright position in FIGURE 6. Each film heater is provided with a terminal block that is fastened as an integral part to the base plate 35. For example, the broiler unit 27 has a terminal block 37, the film heater 33 of the upper drawer 11 has a terminal block 38 and the film heater 34 of the lower drawer 12 has a terminal block 39. Both of the terminal blocks 38 and 39 of the drawers extend through the walls of the drawer so as to present a fixed contact that is located at the back of each drawer for engagement with a movable contact mounted on the back wall of the cabinet. For example, terminal block 38 of the upper drawer 11 in FIGURE 6 has a fixed contact 40 for making engagement with a movable contact 41 when the drawer 11 is in its upright position. This same fixed contact 40 is adapted to make connection with a second movable contact 42 when the upper drawer 11 is installed in the cabinet in its inverted position as shown in FIGURE 5. In this position, the movable contact 41 is out of the circuit as is seen in FIGURE 5. Similarly, the terminal block 39 of the lower drawer 12 has a fixed contact 43 for making engagement with a movable contact 44 that is supported from the back wall of the cabinet by means of a cantilever spring 45.

The purpose behind the make and break contacts between the terminal blocks of the drawers and the movable contacts of the cabinet is to automatically disconnect the power to the heating elements when the drawer is being removed from the cabinet and likewise to automatically connect the heating elements to the source of power when the drawers are returned to the normal position within the cabinet. In addition to the make and break drawer contacts there is a master power interlock system that is provided with a pair of single throw, double pole switches 23 and 24 as seen in FIGURE 3 which are connected in the supply leads of the oven ahead of the selector switches 14, 16 and the thermostats 15, 17. Interlock switch 23 cooperates with the upper drawer 11, and the switch is closed when the drawer is located completely within the cabinet. If the drawer 11 is even slightly removed from the cabinet, the interlock switch 23 will completely deenergize the entire drawer oven. The second interlock switch 24 works in a similar fashion with the lower drawer 12.

Considering the terminal block 37 of the broiler unit 27, it has a fixed contact 47 for making an electrical connection with a movable contact 48. This movable contact 48 is supported from a cantilever spring 48' while the other movable contact 42 is supported from a cantilever spring 42'. Both movable contacts 42 and 48 are mechanically joined together by an insulating block 49 so that the movement of one causes a like movement of the other. The movement is governed by the presence or absence of the upper drawer 11 in its inverted position of FIGURE 5. By this is meant that when the upper drawer 11 is inverted and returned to the cabinet in the single large oven position it is necessary to do-energize the broiler unit 27 because the heating element 33 of the upper drawer will be used as the broiler unit. This disconnection is effected by first connecting the fixed contact 40 of the terminal block 38 with the movable contact 42. This switch connection automatically disconnects the broil unit 27 by displacing the movable contact 48 away from the fixed contact 47 of the broil unit. This is clearly shown in FIGURE 5 of the drawings.

Now looking at FIGURE 6, it will be appreciated that the contacts 47 and 48 for the broil unit 27 are normally closed when the upper drawer 11 is in its upright position. In this position both the heating element 33 and the broil unit 27 are capable of being energized. There is one other switching means for cooperation with the upper drawer 11 and this is shown in both FIGURES 5 and 6 as the drawer interlock switch 52 that is shown with a switch lever 53 acting upon a switch button 54. It will be noticed in FIGURE 6 that when the upper drawer 11 is in its upright position the terminal block 38 of the drawer will depress the switch lever 53. Alternatively, the switch lever 53 is not engaged by any part of the upper drawer when said drawer is in its inverted position of FIGURE 5. The internal workings of this drawer interlock switch 52 will be explained in greater detail hereinafter during the explanation of the circuit diagram of FIGURE 7.

Experience has taught that about 42% of the heat loss from a standard oven is due to heat conduction through various parts of metal in contact with each other. Accordingly, it is expedient to reduce this amount of heat loss due to conduction by restricting the metal to metal contact between each drawer 11 and 12 and the supporting cabinet 10. Each drawer is shown as being substantially identical in form but this is not an absolute necessity. It is merely an expedient to reduce the tooling cost by using the same tools for making both drawers. It is recognized, however, that the two drawers are different in function and therefore they could be different in design without causing any difficulty. However, each drawer will be described in detail as it is shown in the drawings.

The sides and back walls of each drawer 11 and 12 are provided with upper and lower horizontal flanges 55, 56 and 57, 58 respectively. These flanges are support flanges that cooperate with flanged rollers or slide means that are located in groups at the upper and lower edges of the side walls of the cabinet as is best seen in FIGURE 3. The top rollers are identified as elements 60, while the bottom rollers are identified as elements 61. These bottom rollers are shown in side view at the lower portion of both FIGURES 5 and 6. Each group of rollers is rotatably supported from an adjustable bar 62 that is fastened to the side wall of the cabinet by means of fasteners 63 that extend through an elongated slot 64 of the bar to be threaded into the wall of the cabinet. This will be recognized as a means for obtaining proper alignment of the drawers within the cabinet so that the air gap between the two drawers can be held to a minimum so as to restrict the heat loss therefrom.

The lower drawer 12 is always supported in an upright position on the lower rollers 61 by the lower flanges 58, while the upper drawer 11 may be suspended from its upper flanges 55 on the upper rollers 60 in the single small oven position of FIGURE 6. Alternatively, the upper drawer 11 may be suspended from its lower flanges 56 on the upper rollers 60 when the drawer 11 is inverted as is clearly illustrated in FIGURE 3. One reason for locating the roller assemblies 60 and 61 along the top and bottom of the side walls of the cabinet is to provide space at the mid-height of the cabinet for a resilient metal gasket 66 that seals the drawer openings. As best seen in FIGURE 3, the gasket is of generally C-shape in cross-section and is adapted to extend around the three vertical walls of the cabinet; namely, the two opposite side walls and across the back wall of the cabinet so as to engage over the flanges 55 and 57 in the single oven combination of FIGURE 3, and flanges 56 and 57 in the double small oven combination of FIGURE 6.

Figure 2:
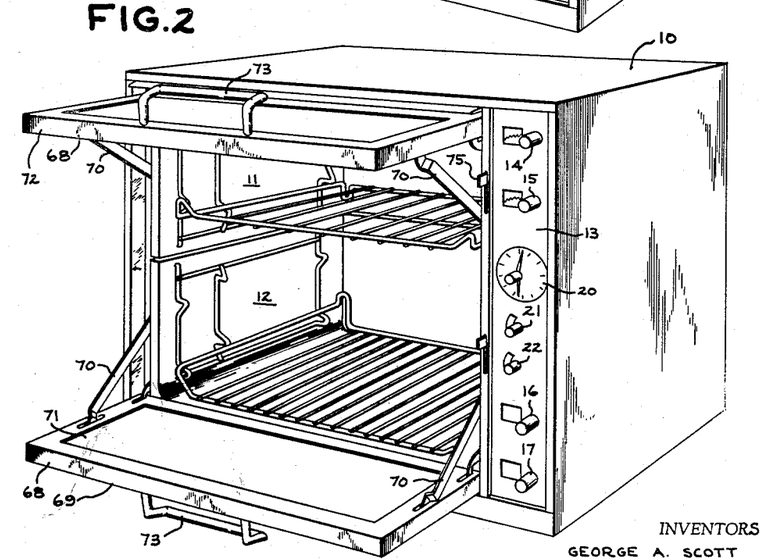
FIGURE 2 is a perspective view similar to that of FIGURE 1 showing the oven assembled as a single large oven where both doors of the oven have been pivoted to the fully open position.

Turning now to a consideration of the assembly views of FIGURES 1 and 2, it should be appreciated that the front wall of each drawer 11 and 12 is formed with a door 68 and 69 respectively which is hinged along the front edge of the bottom wall of the drawer and is provided with a pair of hinge straps 70 which help to support the door in a horizontal fully open position. Each hinge strap 70 is pivotally mounted to the door at one end and slidably mounted to the drawer at the other end. Each door consists of double panes of tempered glass 71 which are supported in a narrow metal frame 72 so that the door is mostly transparent for ease of viewing within the ovens. A handle 73 is fastened on the door frame 72 adjacent the swinging edge of the door for grasping the door and swinging it between open and closed positions as well as for pulling the drawer out of the cabinet and returning the drawer to the cabinet.

An elaborate linkage door mechanism is provided within the cabinet, but it is not described here in detail as it forms the subject matter of a co-pending application entitled "Door Mechanism for Convertible Ovens" of George A. Scott and Milton S. Williams, Jr., now Patent No. 3,131,981 which was filed concurrently herewith, and is assigned to the General Electric Company, assignee of the present invention. The purpose of this mechanism is (1) to lock the drawers 11 and 12 in a closed position within the cabinet 10, (2) to permit the doors 68 and 69 to be operated independently of each other between open and closed positions while the drawers are locked closed in the upright positions of FIGURE 1, (3) to lock the doors closed when the drawers are unlatched from the cabinet and while they are being rolled outwardly, (4) and lastly to connect the operation of the two doors 68 and 69 together when the upper drawer 11 is inverted as seen in FIGURE 2 so that the movement of either door will cause simultaneous movement of the other door. Some of the hardware for this door mechanism is identified as element 75 although it will not be further described herein.

Figure 7:
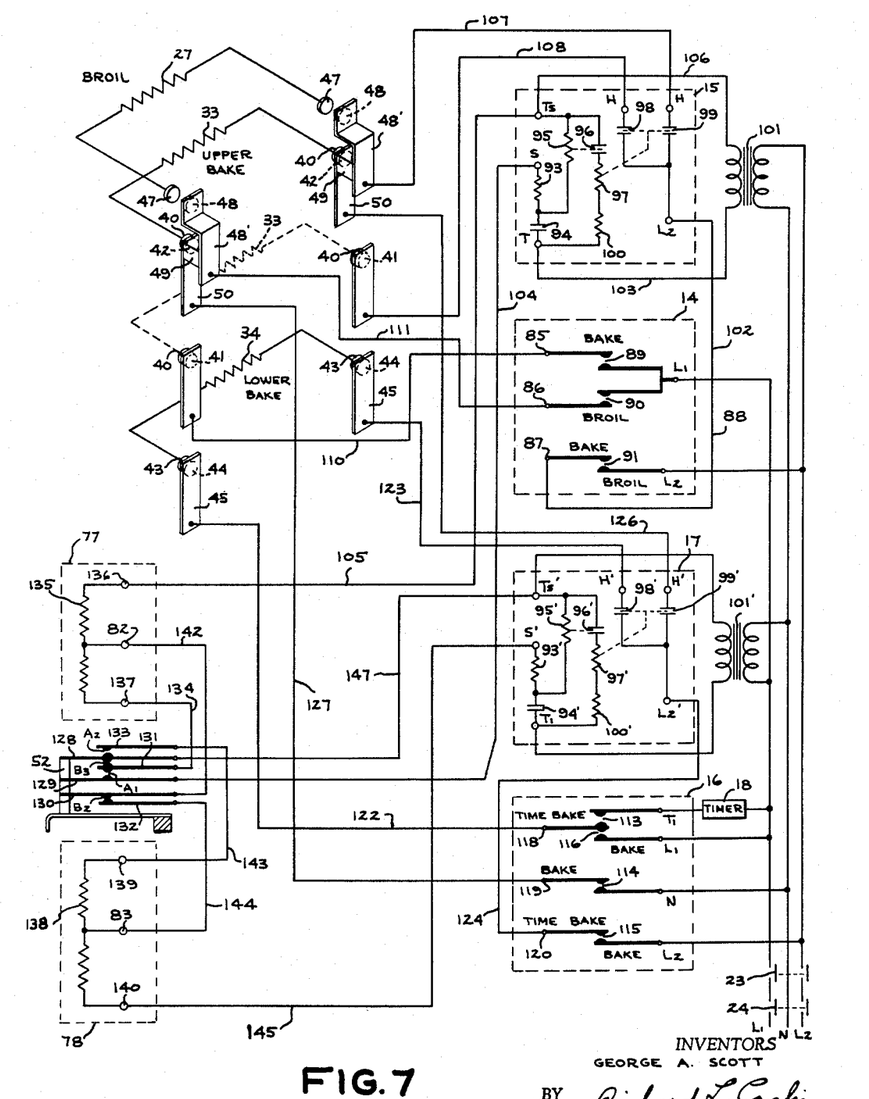
FIGURE 7 is an energizing circuit diagram for the various heating units of the oven and it includes the temperature control means, power means and the interlock switch means for governing the heating units in the various positions of the drawer ovens.

Before discussing the circuit diagram of FIGURE 7, it is necessary to understand that there are two external temperature sensors 77 and 78 that are fastened to the interior of the cabinet 10 and are adapted to bear against the outer surface of the oven liner walls 28 of each drawer oven so as to be in heat transfer relation therewith, as is best seen in FIGURES 3 and 4. For example, sensor 77 acts upon the upper drawer 11 and it is vertically spaced above sensor 78 for the lower drawer 12. As shown in FIGURE 4, the back wall of each drawer is provided with a recessed portion 79 in the outer oven wall 29 so that a spring biased plunger 80 of the sensor 77 may be pressed against the outer surface of the oven liner walls 28. Each sensor is located to be in close proximity to the related drawer bake unit.

A suitable type of temperature sensor is a variable-resistance transducing device for reflecting minute changes of experienced temperature into corresponding variations in the output characteristic of the device. Such a temperature sensor is of the general type disclosed in the Sivacek Patent 2,980,875 which is assigned to the King-Seeley Corporation. Similar types of temperature sensors are widely used today as an automatic temperature control device for the surface units of electric ranges. It is usually located in the center of the surface unit so as to be spring-biased upwardly into good metal to metal contact with the bottom of a pan being heated on the unit. Each sensor may be constructed of fine wire such as platinum having a high positive temperature coefficient of resistance, or as an alternative a ceramic thermistor element may be used having a high negative coefficient of resistance. It is recognized that the use of a negative coefficient material reverses the action of the thermostat that is controlled by the sensor. For purposes of the description of the present invention, the sensor has a high positive temperature coefficient of resistance.

Heretofore, oven temperatures have been controlled by means of detecting variations in the air temperature within the oven. The variation is then transmitted either by means of a hydraulic or an electrical impulse to a thermostat that controls the oven at a desired pre-set temperature. The present invention departs from the prior art by controlling the oven temperature by means of controlling the oven liner wall temperature rather than the oven air temperature. This is possible because of the large thermal mass of the oven liner wall as compared to the air contained in the oven. There is not one, but two external sensors 77 and 78. These sensors operate as a separate control means when the two drawers 11 and 12 are mounted in the upright positions in the cabinet. The same external sensors are connected in series when the upper drawer 11 is inverted to form with the lower drawer 12 a single large oven. Then each sensor is connected in the control circuit so that only one-half of its electrical resistance is in the circuit so that the signal from each when added to the other gives the effect of one sensor sensing the average temperature of each individual sensor, thus preventing both excessive overshoot and undershoot of the desired pre-set temperature. It is evident that if only the lower sensor 78 were used, the oven would be cycled off before the pre-set temperature is reached causing an undershoot of the temperature curve. If only the upper detector were used, then the oven temperature would not be cycled off soon enough thereby causing a large overshoot above the desired pre-set temperature. The close proximity of each sensor to the related drawer bake unit is important due to the anticipation caused by the heating elements.

One reason that dual external sensors operate in a superior manner for a single large oven is that the two sensors tend to average out the oven liner wall temperature. This averaging minimizes the tendency of the temperature to overshoot on the first cycle of oven operation. Also, some food loads such as cookies using a large imperforate cookie sheet tend to divide the oven compartment into two distinct temperature zones. In a standard oven with an air temperature sensing control, the lower portion of the oven below the cookie sheet would become overheated because it is isolated from the normal thermostat location at the top of the oven cavity. By means of dual external sensors the back wall of the oven liner becomes hotter on the lower portion and the lower sensor detects this over-temperature condition and cuts back on the thermostat until the upper portion of the wall has had an opportunity to equalize in temperature. One important factor with regard to oven liner temperature control is the fact that most of the cooking energy is obtained from re-radiation from the oven liner walls. This is particularly true in the case of an oven liner which has a high emissivity coating, such as porcelain enamel. By controlling the oven liner walls at a desired temperature, it is possible to obtain the best balance of heat energy for any given cooking load. Finally, an external oven liner temperature control system gives the added advantage of removing all of the control mechanism from within the oven compartment thus resulting in a less cluttered appearance and eliminating the possibility of the housewife damaging the control inadvertently as during the cleaning of the oven.

Turning now to a consideration of the circuit diagram of FIGURE 7, a review will first be made of the larger elements of the circuit which have been discussed heretofore. There are the three heating elements, namely, the broiler unit 27, the upper bake unit 33 and the lower bake unit 34. The upper bake unit 33 is shown in full lines to illustrate how it would be energized if it were in the inverted position of the top drawer 11 as in FIGURE 3, while the same upper bake unit 33 is shown in dotted lines to illustrate how the heating unit would be energized if the drawer 11 were in the upright position of FIGURE 6.

The manual controls for the upper drawer 11 are represented by the oven selector switch 14 and the thermostat 15 which are each shown in the circuit diagram as being encompassed by a dotted square. Moreover, the controls for the lower drawer 12 are represented by the oven selector switch 16 and the thermostat 17 as well as by the timer 18. The dual external sensors 77 and 78 are shown at the lower left-hand corner of the circuit and they are wired into the drawer interlock switch 52 that was mentioned previously in describing FIGURES 5 and 6 of the drawing as being a double-throw gang switch that is acted upon by the relative position of the top drawer 11.

This interlock switch 52 is always actuated into one of two positions. The first switch position would be that of FIGURE 6 where the terminal block 38 of the upper drawer 11 presses against the switch lever 53 so as to depress a switch button 54 that underlies the lever. This switch position separates the two sensors 77 and 78 electrically from each other so that they are, in effect, two separate temperature control means; namely, the upper system and the lower system. Two systems are necessary when the two drawers 11 and 12 are in their upright positions thereby forming with the cabinet 10 two small individual oven compartments.

In the second position of the drawer interlock switch 52, the switch lever 53 is free of contact with the upper drawer 11 as best seen in FIGURE 5 because the drawer 11 has been inverted and assembled back into the cabinet to form with the lower drawer 12 a single large oven. This second switch position takes the upper switch 14 and thermostat 15 out of the circuit so that all of the temperature control is in the lower set of controls 16 and 17. Moreover, the two external sensors 77 and 78 are connected in series by center taps 82 and 83 respectively so that each contributes one-half of the required resistance so that they will have the combined effect of a single sensor working in conjunction with the thermostat 17.

The power is supplied to the oven from the usual single phase, 236 volt, alternating current, three-wire Edison service entrance commonly found in an adequately-wired residence. The three wires are identified as line wires L1 and L2 and a Neutral wire N, it being understood that there is a potential of about 236 volts across lines L1 and L2, and about 118 volts across either line L1 or L2 and the Neutral wire N. Notice the master power interlock switches 23 and 24 in the power leads L1 and L2 for de-energizing the oven completely whenever either drawer 11 or 12 is even slightly displaced from the cabinet 10. Considering the top drawer 11 and its manual control means 14 and 15, the oven selector switch 14 is interposed between the source of voltage and the heating elements 27 and 33 in order to control the amount of power available to convert to heat energy within the upper drawer. The switch 14 has but two line terminals identified as L1 and L2 to conform with the identification of the wires bringing electrical current to the switch. There are also two load terminals 85 and 86 and a third terminal 87 that is connected to the thermostat 15 by means of lead 88. The switch 14 includes three sets of switch contacts 89, 90 and 91 and these contacts are also labelled according to the various cooking operations. For example, contacts 89 are closed during the Baking operation, contacts 90 are closed during the Broiling operation and contacts 91 are closed during both the Baking or the Broiling operations.

Before tracing the power circuit for the various cooking operations of the oven, a brief description of the thermostat 15 will be given, it being understood that both thermostats 15 and 17 are identical. In describing the temperature sensors 77 and 78 mention was made that a detailed explanation of a typical sensor, except that it is not center-tapped, could be obtained by studying the Sivacek Patent 2,980,875. The thermostat 15 is also a standard item of commerce and a detailed explanation of it can be had by referring to the Woodward Patent 2,970,201, which is likewise assigned to the King-Seeley Corporation. The thermostat 15 has a voltage regulating relay comprising heater winding 93 and contacts 94 where the relay is controlled by the variable-resistance sensor 77. The voltage regulator relay in turn controls a responder relay made up of a heater winding 95 and contacts 96. This responder relay controls an output relay that comprises a heater winding 97 and double pole contacts 98 and 99 which finally control the energization of the heating elements 27 and 33 of the upper drawer compartment from a source of voltage. Cooperating with the voltage regulating relay contacts 94 is an anticipator winding 100 which is adapted to be wound on the back leg of a U-shaped voltage regulator bimetal (not shown) so that if the line voltage drops the anticipator winding tends to open the relay contacts 94 sooner thereby keeping the responder contacts 96 closed slightly longer and consequently adjusting the "On-Off" ratio to maintain a desired output. Thus, overcompensation is achieved to give a more perfect control of power supplied to the heating elements.

This temperature control circuit operates at a potential of about twelve volts supplied from the secondary of a step-down transformer 101. The thermostat 15 has six terminals; namely, terminal L2 that is connected through the switch 14 to line L2 by means of lead 102, terminal T which is connected to one side of the secondary of the transformer 101 by lead 103, terminal S which is connected to the sensor 77 by means of lead 104 and the drawer interlock switch 52, terminal Ts which is connected to both the sensor 77 and the transformer 101 by means of leads 105 and 106 respectively, and finally the two heater terminals H and H which are connected to the return side of the circuit through the broil unit 27 and the upper bake unit 33 by means of leads 107 and 108 respectively.

Now tracing the power circuit for the Baking operation of the upper individual oven 11 for which the upper bake unit 33 is operated at full wattage across lines L1 and L2 at 236 volts; from line L1 to terminal L1 of the oven selector switch 14, through contacts 89 of the switch and out load terminal 85, through a lead 110 to the movable contact 41, to the fixed contact 40 of the upper bake unit 33, through the bake unit 33 to the other fixed contact 40 of the unit, through the other movable contact 41 and back to the load terminal H of the thermostat 115 by means of lead 108, through the thermostat and out terminal L2 and back to line L1 through lead 88, switch terminal 87, switch contacts 91, to line terminal L2.

The power circuit for a Broiling operation of the upper oven 11 energizes the broiler unit 27 only at full wattage across lines L1 and L2 and the circuit may be traced as follows: from line L1 to switch terminal L1, where the circuit branches through switch contacts 90, out load terminal 86 by means of lead 111 to movable contact 48, contact 47, through the broil unit 33 and back to the thermostat 15 by means of lead 107 and back to line L2 through closed switch contacts 91.

Next to be discussed is the power circuit for the lower drawer 12. The thermostat 17 for the lower drawer is identical with the thermostat 15 of the upper drawer, while the oven selector switch 16 for the lower drawer is slightly modified to accommodate the timer 18. In other words, the switch 16 has the normal terminals and contacts that are included in switch 14 but in addition it includes a timer terminal T1 and switch contacts 113. To explain further the switch 16 is provided with two single pole single throw contacts 114 and 115 and one set of single pole, double throw switch contacts 113 and 116. These contacts are labelled with the functions they accomplish to assist in explaining when they are closed. During a Timed Baking operation contacts 113 and 115 are closed, during a Baking operation in the lower oven 12 contacts 116 and 115 are closed, and finally during a Baking operation for the single large oven contacts 116, 114 and 115 are closed.

To be more specific, it is first necessary to identify the various elements of the switch and thermostat 16 and 17 and the leads that connect these components to the heating elements. The switch 16 has three line terminals L1, N and L2, as well as the timer terminal T1 mentioned previously; and finally, three load terminals 118, 119 and 120. Since the thermostat 17 is identical to thermostat 15 it is shown with the same elements identified with the same reference numerals as in thermostat 15. The exception being that each reference numeral is primed. For example, the voltage regulator relay in thermostat 15 has a heater winding 95 while the same heater winding in thermostat 17 is identified as 95'.

Now tracing the simple power circuit for the Baking operation in the lower individual oven 12 in which the bake unit 34 is operated alone at full wattage across L1 and L2 at 236 volts: the circuit is from line L1 to switch terminal L1, through switch contacts 116 to terminal 118 and then by means of lead 122 to movable contact 44 and fixed contact 43 of the lower bake unit 34, and then from the other fixed contact 43 of the bake unit, through movable contact 44 and lead 123 to the heater terminal H' of the thermostat 17, through the thermostat and out its terminal L2' and by means of lead 124 to line L2 through switch terminal 120, contacts 115 and terminal L2.

The other cooking operation for the small individual oven 12 is a Timed Baking operation where the same drawer heater 34 is energized from lines L1 and L2 at 236 volts, but the circuit is controlled by the timer 18 which is shunted across the switch terminal L1 and switch contacts 116 by means of the switch contacts 113 and switch terminal T1. Otherwise, the circuit is the same as mentioned immediately above.

The last power circuit to be mentioned is when the two drawers 11 and 12 are combined to form a single large oven as is shown in FIGURE 2. In this position both drawer heating units 33 and 34 are energized, while the broiler unit 27 is not energized because of its close proximity to the bake unit 33 of the inverted drawer 11 as is best understood from FIGURE 5. The bake unit 33 of the upper drawer 11 is operated at one-half wattage across line L2 and Neutral N at 118 volts, while the bake unit 34 of the lower drawer 12 is operated at full wattage across lines L1 and L2 at about 236 volts. Three of the four switch contacts of the lower oven selector switch 16 are closed, namely, 116, 114 and 115. The only portions of this power circuit which have not been described heretofore is the connection between the upper bake unit 33 and the lower selector switch 16. This bake unit 33 is energized from line L2 through switch contacts 115, switch terminal 120, lead 124 through the thermostat 17 and terminals L2' and H', and by means of lead 126 to the upper bake unit 33 and then returning to the switch by means of lead 127 and through switch contacts 114 to Neutral wire N.

The one portion of the circuit diagram which has not been described is the portion representing the principal inventive subject matter claimed herein, namely, the control circuit, but before it can be understood intelligently, mention must be made of the drawer interlock switch 52. It was briefly mentioned before with relation to FIGURES 5 and 6 as having a switch lever 53 which acts upon a switch button 54 and supports a gang of three movable contacts 128, 129 and 130. Contacts 129 and 130 are single pole switch contacts that cooperate with fixed contacts 131 and 132. The movable contact 128 is part of a single pole, double throw switch formed with contacts 131 and 133. For example, the contacts 128 and 133 form switch contacts A2, contacts 128 and 131 form switch contacts B3, contacts 129 and 131 form switch contacts A1 and finally, contacts 130 and 132 form switch contacts B2. The contacts A1 and A2 are closed when the drawers 11 and 12 are assembled as two individual ovens as shown in FIGURE 1, while contacts B2 and B3 are closed and the other contacts are open when the upper drawer 11 is inverted to form a single large oven, as will become more apparent hereinafter. Each temperature sensor 77 and 78 is provided with a resistance which is used in total when the control circuit is controlling a single small oven. This resistance is reduced to one-half by a center tap when the two sensors are connected in series with the single lower thermostat 17. Sensor 77 has resistance 135 which is connected to two end terminals 136 and 137 and has a center tap 82 as mentioned previously. Similarly, sensor 78 has a resistance 138 with end terminals 139 and 140 and a center tap 83. Terminal 136 of sensor 77 is connected to the thermostat terminal TS by lead 105, and the center tap terminal 82 is connected to the center tap terminal 83 by means of lead 142, movable contact 130 of the switch 52, contact 132 and lead 144. Terminal 137 is connected to fixed contact 131 of the switch 52 by lead 134. As to the second sensor 78, terminal 139 is connected to contact 133 by lead 143, center tap terminal 83 is connected to fixed contact 132 by lead 144, and the terminal 140 is connected to the thermostat terminal S′ by means of lead 145.

Going back to a consideration of the pair of oven compartments 11 and 12 of FIGURE 1, the control circuit for the upper oven would be from the terminal S of thermostat 15, through lead 104 to the drawer interlock switch 52 by way of contacts A1 to terminal 137 of the upper sensor 77, from the opposite end terminal 136, through lead 105 to the termostat terminal TS. Similarly, the lower sensor 78 would be connected to the lower thermostat 17 by means of lead 145 connected to terminal S′, and lead 147 connected to terminal TS′ through contacts A2 of the switch 52.

The control circuit for the single large oven of FIGURE 2 would have the three sets of contacts of switch 16 closed, namely, 116, 114 and 115. The bake unit 33 of the upper drawer 11 would be connected across lines L2 and Neutral at 118 volts, and the lower bake unit 34 would be connected across L1 and L2 at full voltage at 236 volts. The upper switch 14 and thermostat 15 would be cut out of the circuit, and the lower switch 16 and thermostat 17 would control both the upper bake unit 33 and the lower bake unit 34. The control circuit may be followed from thermostat terminal TS′, lead 147, switch contact B3, and by means of lead 134 to terminal 137 of sensor 77, and out the center tap 82, and by means of lead 142 to switch contacts B2, and by means of lead 144 to the center tap 83 of the second sensor 78 through one-half of the resistance 138 and out terminal 140, and through lead 145 to the thermostat terminal S′. Thus, one-half of the resistance 135 and 138 of each sensor is connected in series with the other for controlling the lower thermostat 17.

Modifications of this invention will occur to those skilled in this art, therefore, it is to be understood, that this invention is not limited to the particular embodiments disclosed but that it is intended to cover all modifications which are within the true spirit and scope of this invention as claimed.

What I claim as new and desire to secure by Letters Patent of the United States is:

1. A domestic oven comprising a cabinet having walls defining an oven cavity, heating means for said cavity, circuit control means for said heating means selectably operable to control the heating means to effect various cooking operations, temperature control means for said heating means settable to control the heating means to hold a selected temperature, said temperature control means comprising a pair of vertically spaced external temperature sensors in heat transfer relation with the outer surface of the oven walls, each sensor having an electrical resistance in series connection with the other, a voltage regulating relay connected with the series resistances of the sensors so that the sensors vary the effective output voltage of said relay in accordance with the sensed temperature of the cavity walls, a responder relay receiving the effected output voltage of the voltage regulator, and an output relay controlled by the responder relay for controlling the output of the heating means, the external temperature sensors serving to control the temperature of the oven walls thereby controlling the temperature within the oven cavity.

2. A cooking apparatus comprising an outer cabinet and inner walls defining an oven cavity having a front access door, heating means for said cavity, a source of electrical current for energizing the heating means, switch means for said heating means selectably operable to control the heating means to effect various cooking operations, and temperature control means for said heating means settable to control the heating means to hold a selected temperature; said invention comprising a temperature control means having a pair of vertically spaced external temperature sensors in heat transfer relation with the outer surface of the walls of the oven cavity, each sensor having an electrical resistance in series connection with the other, a voltage regulating relay connected to the said sensors so that the sensors vary the effective output voltage of said relay in accordance with the sensed temperature of the oven walls, a responder relay receiving the effective output voltage of the voltage regulator, and an output relay controlled by a responder relay for controlling the output of the heating means.

3. A convertible drawer oven comprising a cabinet structure and a pair of drawer ovens stacked one above the other to form two small oven compartments, heating means for each drawer, a source of electrical current for each heating means, selector switch means for controlling the current to each heating means so as to effect various cooking operations, and temperature control means for each heating means to control the heating means so as to hold a selected temperature; the invention comprising a temperature control means having a pair of vertically spaced external temperature sensors each in close proximity to a heating means of one of the drawers, where each sensor is in heat transfer relation with the outer surface of one of the drawer ovens, the top drawer being capable of being removed from the cabinet and replaced in an inverted position back into the cabinet to form with the lower drawer one large oven, and switching means so that said temperature control means for each drawer is automatically united into a single control means for the large oven when the upper drawer is placed in an inverted position in the cabinet.

4. A convertible drawer oven as recited in claim 3 with the inclusion of a master power interlock means for de-energizing the oven whenever either drawer is displaced outwardly of the cabinet.

5. A convertible drawer oven as recited in claim 3 wherein the said switching means includes a drawer interlock switch means cooperating with the upper drawer oven for separating the temperature control means into two separate systems when the upper drawer is in its upright position within the cabinet, the said drawer interlock switch means serving to combine the two separate temperature control means into a single temperature control means for the single large oven when the upper drawer is inverted and returned to the cabinet.

6. A drawer comprising a cabinet structure with an open front and a pair of pull-out drawers stacked one above the other within the cabinet opening to form two small oven compartments, each drawer having a pull-down oven door as its front wall for gaining access to the individual oven compartments, a heating element in the bottom of each drawer, and a third heating element beneath the top wall of the cabinet, this third heating element serving as a broiling unit for the upper drawer only, a source of electrical current for energizing the heating elements, separate selector switch means for governing the energization of the heating elements in the upper drawer and the heating element in the lower drawer, and separate temperature control means for the upper drawer and the lower drawer, each of said temperature control means comprising an external temperature sensor mounted within the cabinet opening to be in heat transfer relation with the outer surface of the oven liner wall of the drawer, where one sensor is vertically spaced from the other along the back wall of the cabinet, each sensor being combined with a related temperature control means for registering the variations in temperature of the walls of the drawer and for controlling the energization of the heating element in order to obtain the desired selected temperature, the upper drawer being capable of being removed from the cabinet, inverted and returned to the cabinet to form with the lower drawer a single large oven, and switching means operated by the inverted position of the top drawer for connecting a portion of each sensor in series with the other in the manner of a dual sensor for detecting temperature variations for the single large oven position so that the combined effect of both sensors may be transmitted to a single temperature control means for obtaining more uniform temperatures for the walls of the large oven.

7. A convertible drawer oven comprising a cabinet structure and a pair of pull-out drawer-type ovens stacked one above the other within the cabinet to form two small oven compartments, the top drawer being capable of being removed from the cabinet and placed in an inverted position back into the cabinet to form with the lower drawer one large oven, and heating means within each drawer, a source of electrical current for energizing the heating means and a separate selector switch means for each drawer oven to control the heating means to effect various cooking operations, and separate temperature control means for each drawer for holding the temperature within each drawer to a selected temperature, each of said temperature control means comprising an external temperature sensor mounted within the cabinet structure to be in heat transfer relation with an outer surface of the walls lining the oven cavity of each drawer, each sensor being connected to an electrical thermostat which comprises a pulsing voltage regulator relay in series with the sensor so that the sensor varies the effective output voltage of said relay in accordance with the sensed temperature of the walls of the drawer oven, the thermostat also including a responder relay that receives the effective output voltage of the voltage regulating relay, and an output relay controlled by the responder relay for controlling the energization of the heater means, the two temperature control means being united into a single control system when the upper drawer is inverted into the cabinet, each sensor being connected in series with the other so that the electrical effect of the combined sensors is the same as that of a single sensor, where the combined sensors are joined to a single electrical thermostat for holding the temperature within the large oven to a selected temperature.

8. A domestic oven comprising a cabinet having walls defining an oven cavity, heating means for said cavity, circuit control means for said heating means selectably operable to control the heating means to effect various cooking operations, temperature control means for said heating means settable to control the heating means to hold a selected temperature, said temperature control means comprising a pair of vertically spaced external temperature sensors in heat transfer relation with the outer surface of the oven walls, each sensor being joined with the other so as to average out the effect of each sensor, the sensors being connected to a thermostatic device so that the combined effect of the dual sensors may be transmitted to the thermostat for obtaining more uniform temperatures for the walls of the oven.

9. A convertible drawer oven comprising a cabinet structure and a pair of drawer ovens stacked one above the other to form two small oven compartments, the bottom portion of each drawer oven including a heating element, the underside of the top wall of the cabinet structure including a third heating element, a source of electrical current for each heating means, selector switch means for controlling the current to each heating means so as to effect various cooking operations, and temperature control means for each heating means to control the heating means so as to hold a selected temperature, the said temperature control means including a pair of vertically spaced external temperature sensors where each sensor is in heat transfer relation with the outer surface of one of the drawer ovens, the top drawer being capable of being removed from the cabinet and replaced in an inverted position back into the cabinet to form with the lower drawer one large oven, an interlock switch means mounted within the cabinet for de-energizing the third heating means located beneath the top wall of the cabinet whenever the upper drawer is inverted and replaced into the cabinet so as to avoid the concentration of an excessive amount of heat in the vicinity of the top wall of the cabinet.

References Cited by the Examiner
UNITED STATES PATENTS

| | | | |
|---|---|---|---|
| 1,406,372 | 2/22 | Grapp | 219—394 |
| 2,535,379 | 12/50 | White | 219—398 |
| 2,668,221 | 2/54 | McCormick | 219—413 |
| 2,994,760 | 8/61 | Pecoraro et al. | 219—394 |
| 3,051,814 | 8/62 | Bergsma | 219—491 |
| 3,069,524 | 12/62 | Hanssen | 219—488 |

RICHARD M. WOOD, *Primary Examiner.*